(12) United States Patent
Kimata

(10) Patent No.: US 7,020,487 B2
(45) Date of Patent: Mar. 28, 2006

(54) PORTABLE TELEPHONE GPS AND BLUETOOTH INTEGRATED COMPOUND TERMINAL AND CONTROLLING METHOD THEREFOR

(75) Inventor: Yusuke Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 683 days.

(21) Appl. No.: 09/946,638

(22) Filed: Sep. 6, 2001

(65) Prior Publication Data

US 2002/0032039 A1    Mar. 14, 2002

(30) Foreign Application Priority Data

Sep. 12, 2000    (JP) .............................. 2000-277023

(51) Int. Cl.
    *H04M 1/00*    (2006.01)
(52) U.S. Cl. ................ 455/556.1; 455/41.2; 455/456.1
(58) Field of Classification Search ............ 455/552.1, 455/553.1, 556.1, 456.1, 193.1, 176.1, 78, 455/103, 161.1, 150.1, 168.1, 234, 188.1
    See application file for complete search history.

(56) References Cited

U.S. PATENT DOCUMENTS

| | | | | |
|---|---|---|---|---|
| 5,794,159 | A | * | 8/1998 | Portin ..................... 455/553.1 |
| 5,852,603 | A | * | 12/1998 | Lehtinen et al. ............ 370/280 |
| 6,035,213 | A | * | 3/2000 | Tokuda et al. ........... 455/553.1 |
| 6,107,960 | A | | 8/2000 | Krasner |
| 6,246,376 | B1 | * | 6/2001 | Bork et al. ................. 343/760 |
| 6,298,224 | B1 | * | 10/2001 | Peckham et al. ........ 455/188.1 |
| 6,529,749 | B1 | * | 3/2003 | Hayes et al. ............. 455/575.7 |
| 6,694,150 | B1 | * | 2/2004 | Standke et al. .......... 455/552.1 |
| 6,731,349 | B1 | * | 5/2004 | Van Der Wijst ............ 348/732 |

FOREIGN PATENT DOCUMENTS

| | | | |
|---|---|---|---|
| DE | 197 42 405 A1 | | 4/1999 |
| EP | 1006669 | | 6/2000 |
| EP | 1006669 A1 | * | 6/2000 |
| JP | 64-86635 | | 3/1989 |
| JP | 6-253362 | | 9/1994 |
| JP | 6-268585 | | 9/1994 |
| JP | 7-87551 | | 3/1995 |
| JP | 9-325180 | | 12/1997 |
| WO | WO 97/14056 A1 | | 4/1997 |

OTHER PUBLICATIONS

Patent Abstracts of Japan, vol. 1998, No. 4, Mar. 31, 1998 for JPA 9-325180.

* cited by examiner

*Primary Examiner*—William Trost
*Assistant Examiner*—Brandon J. Miller
(74) *Attorney, Agent, or Firm*—Sughrue Mion, PLLC

(57) ABSTRACT

A terminal device is provided for realizing exclusive control of the portable telephone, GPS and Bluetooth integrated terminal. The terminal device includes a terminal management control device(20) which in case of detecting all of the portable telephone terminal device(40), GPS terminal device (50) and the Bluetooth terminal device(60) being set to the ON state, performs exclusive control, based on setting values of the management information, read out from the memory device(30), with turning two of the portable telephone terminal device, GPS terminal device and the Bluetooth terminal device on and turning the remaining one off, or alternately turning the Bluetooth terminal device on for a preset time interval and subsequently turning the GPS terminal device off for a preset time while turning on the portable telephone terminal device at all times.

25 Claims, 11 Drawing Sheets

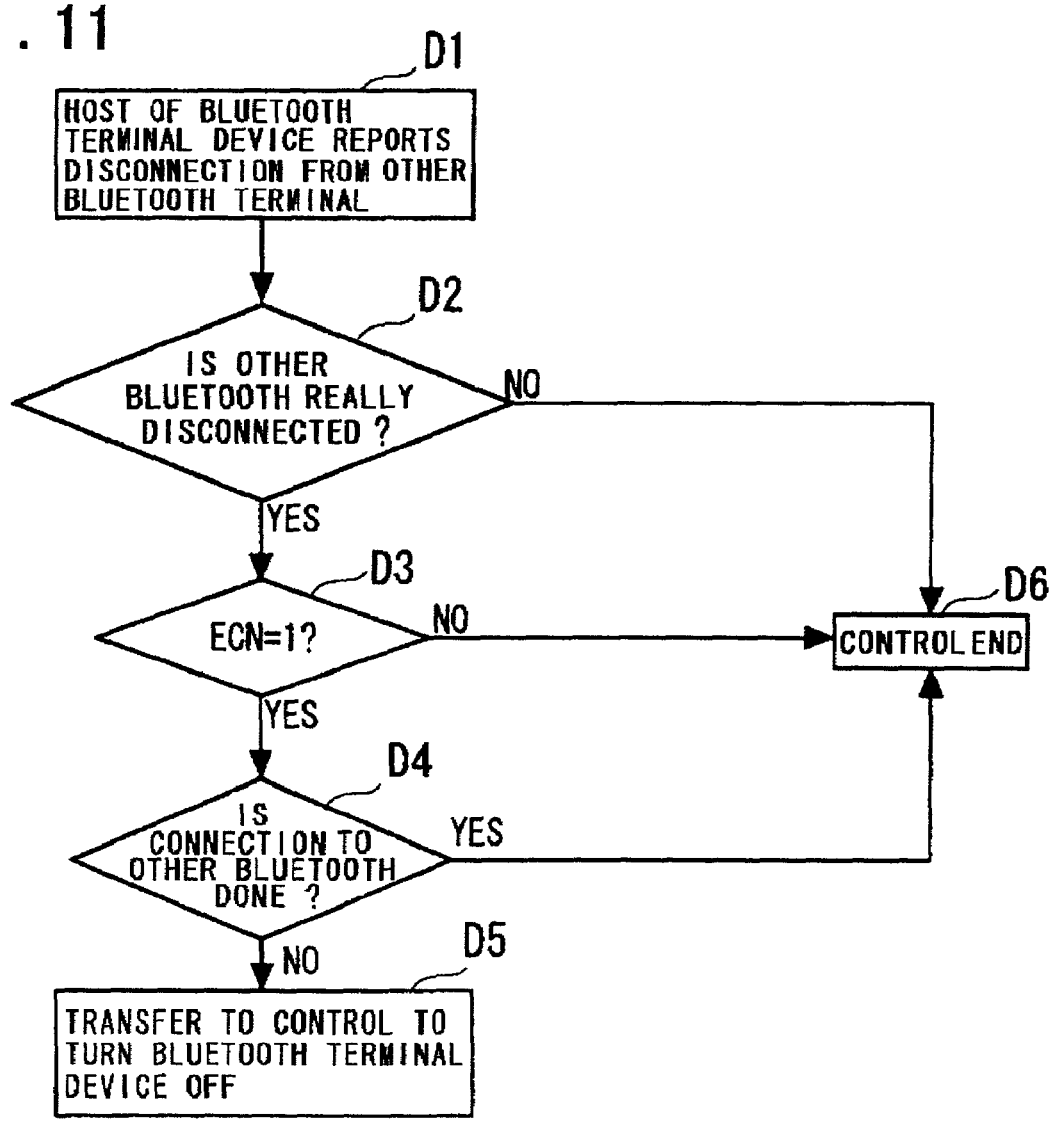

PORTABLE TELEPHONE GPS AND BLUETOOTH INTEGRATED COMPOUND TERMINAL AND CONTROLLING METHOD THEREFOR

FIELD OF THE INVENTION

This invention relates to a portable terminal device. More particularly, it relates to a compound information terminal device having a portable telephone terminal device, a GPS terminal device and a Bluetooth terminal device, integrated together, and a controlling method therefor.

BACKGROUND OF THE INVENTION

The Bluetooth is a short range wireless communication technique, activities for standardization for which were started as from 1998 by Ericsson of Sweden, IBM of USA, Intel Corp. of USA, Nokia of Finland and TOSHIBA. The Bluetooth adopts a spread spectrum frequency hopping system, as a communication schema, and transmits speech data and asynchronous data at a short distance of the order of 10 m, with a frequency band of 2.4 GHz, using 79 channels for a 1 MHz band, with the actual transmission rate being 1 Mbits/sec as specified in Version 1.0 (disclosed in July 1999). Version 1.0 prescribes lower layers, such as a RF circuit or a baseband signal processing circuit, and middle ware (protocol stack), such as L2CAP (Logical Link Control Adaptation Protocol), RFCOMM, SDP (Service Discovery Protocol) or OBEX (Object Exchange Protocol) and a peer-to-peer connection (one-to-one connection) is provided between a portable telephone(mobile communication) terminal and a personal computer(or a portable information terminal, an access point) and also is provided multi-point connections.

There is also known a portable information terminal having a personal handyphone system terminal (PHS terminal) and a GPS (Global Positioning System) receiver for acquiring the position information of the terminal (see for example the JP Patent Kokai JP-A-9-325180).

SUMMARY OF THE DISCLOSURE

Meanwhile, in case of constructing a compound information terminal which comprises a portable telephone terminal device, a GPS (Global Positioning System) terminal device and a Bluetooth terminal device, together, and the portable telephone terminal device adopts as a communication schema, a GSM (Global System for Communication) system which is used mainly in Europe and USA, the differential frequency (fbt−fc) (approximately 1485 to 1607 MHz) produced by intermodulation of the transmission frequency of the GMS portable telephone set fc (890 to 915 MHz) and the transmission/receive frequency of Bluetooth fbt (2400 to 2497 MHz) becomes an interference signal with respect to the GPS frequency fgps (1575.42 MHz), and hence possibly leads to some malfunction of the GPS terminal device.

For overcoming this inconvenience, it is necessary to inhibit simultaneous transmission from the GSM portable telephone terminal device, GPS terminal device and the Bluetooth terminal device, that is to turn off one of the terminal devices at all times.

It is therefore an object of the present invention to overcome the aforementioned problem and to provide a compound information terminal device, which may be applied with advantage to a compound information terminal at least including a portable telephone terminal, a GPS terminal and a Bluetooth terminal, and which is able to realize exclusive control of respective terminals such as to evade adverse effects on signal reception by the GPS terminal.

For accomplishing the above object, in accordance with one aspect of the present invention, a compound information terminal device is provided that at least includes a first transmitter/receiver device for performing transmission/reception using a first frequency band, a second transmitter/receiver device for performing transmission/reception using a second frequency band and a first receiver system for receiving a signal of third frequency band, the intermodulation distortion of a signal of the first frequency band and a signal of the second frequency band having a frequency component overlapping with the third frequency band, in which the compound information terminal device also include means which performs control so that two of three systems, namely the first transmission/reception system, second transmission/reception system and the first reception system are turned on at all times in accordance with predetermined setting or while one system of said first and second transmitter/receiver device is set to ON state on at all times, one and the other of the remaining two systems are turned on and off, respectively, and subsequently of turning the one and the other system off and on, respectively, by way of performing exclusive control, with the on/off operations being performed repeatedly.

In accordance with another aspect of the present invention, in switching control of the first and the second communication devices to communication enabled and communication disabled states, a power supply of a transmitter in each of the first and second communication devices is turned on and off, respectively.

In accordance with another aspect of the present invention, in switching control of the first and the second communication devices to communication enabled and communication disabled states, a signal path of a transmission signal in a transmitter in each of said first and second communication devices is set to a connected state and to a disconnected state, respectively.

In accordance with another aspect of the present invention, in performing switching control of said third communication device to communication enabled and communication disabled states, a power supply of a receiver of said third communication device is turned on and off, or a signal path of a receiving signal in the receiver is set to a connected state and to a disconnected state.

In accordance with another aspect of the present invention, is provided a method is for controlling a compound information terminal device at least including a first communication device which performs wireless communication using a first frequency band; a second communication device which performs wireless communication using a second frequency band; and a third communication device which performs reception of a wireless signal of a third frequency band;

wherein
the method includes control operation so that when the intermodulation distortion of a signal of the first frequency band handled by said first communication device with a signal of the second frequency band handled by said second communication device has a frequency component that is within said third frequency band, up to two of said first to third communication devices are communication enabled in accordance with a predetermined setting; or alternate switching control is repeated such that one of said first to third communication devices is communication enabled at all times and one of the remaining two is communication enabled for a preset time period during which the other is communication disabled, said one terminal being subsequently communication disabled for a preset time period during which the other is communication enabled.

More specifically, the present invention provides a compound information terminal device comprising a portable terminal device, a GPS terminal device and a Bluetooth terminal device, integrated together, including a terminal management control device operable for performing exclusive control so that, if a power on request of one of the portable terminal device, GPS terminal device and the Bluetooth terminal device is input, it is detected that not only the terminal device in the currently ON state, but also the three terminal devices, namely the portable terminal device, GPS terminal device and the Bluetooth terminal device, are set to be ON, two of the portable terminal device, GPS terminal device and the Bluetooth terminal device are turned on, with the remaining terminal device being turned off, or the GPS terminal device is turned on with the Bluetooth terminal device being turned off for a preset time and subsequently the Bluetooth terminal device is turned on with the GPS terminal device being turned off, for a preset time interval, with the portable terminal device being turned on at all times, with the on/off operations being carried out repeatedly by way of performing exclusive control. As may be understood from the description of the following embodiments, the above object may similarly achieved in accordance with respective claims.

Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 11 is a flow diagram for illustrating the operation of a third embodiment of the present invention.

PREFERRED EMBODIMENTS OF THE INVENTION

Preferred embodiments of the present invention will now be described with reference to the drawings. In its preferred embodiment, the present invention provides a compound information terminal device comprised of a portable terminal device, as a first communication device for wireless communications, a Bluetooth terminal device (or a wireless LAN terminal), as a second communication device for wireless communication and a GPS terminal device as a third communication device, integrated together, in which a terminal management control device 20 is provided for exclusively controlling (controlling lock and unlock) the portable terminal device, GPS terminal device and the Bluetooth terminal device to evade the effect on the GPS frequency fgps (1575.42 MHz) by the differential frequency (fbt−fc) of the distortion components generated by intermodulation of the transmission/receive frequency fc of the portable telephone terminal device and the transmission/receive frequency of the Bluetooth terminal fbt (2400 to 2497 MHz).

Figure 1:
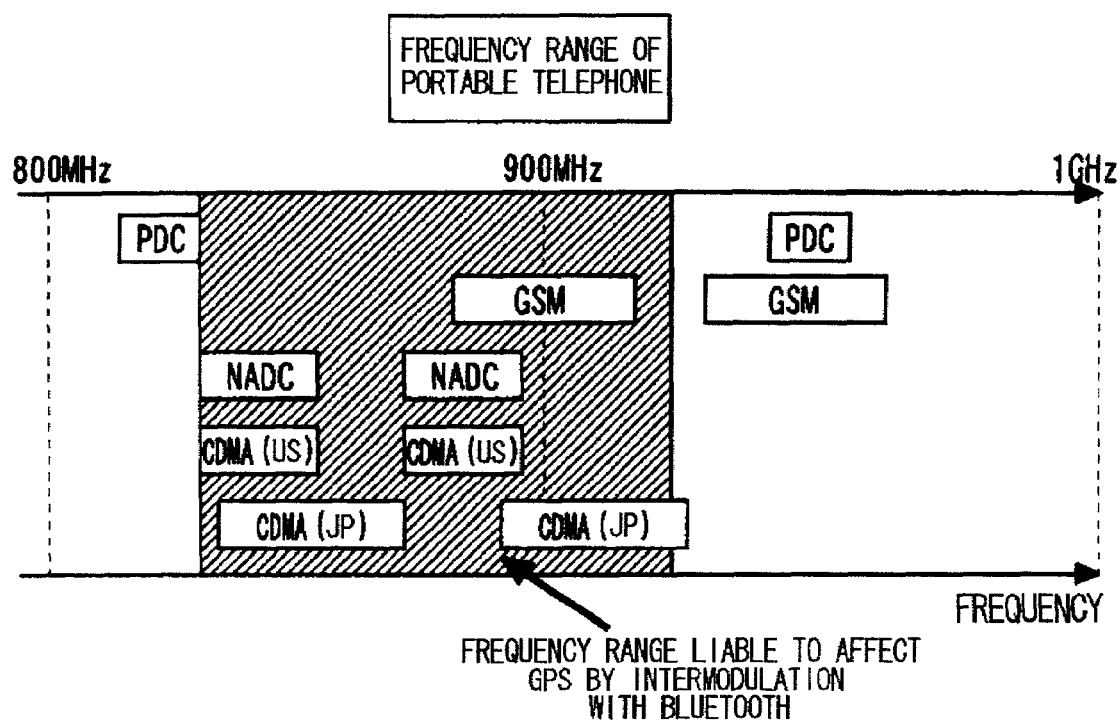
FIG. 1 schematically shows the frequency band for illustrating the principle of the present invention.

For example, if, with the use of a frequency band of approximately 825 to 922 MHz, as the frequency fc of the potable telephone, exclusive control of the portable telephone terminal device, a GPS terminal device and a Bluetooth terminal device is not made, the differential frequency fbt−fc (approximately 1478 to 1672 MHz) produced by intermodulation of the transmission/receive frequency fc of the portable telephone terminal device and the transmission/receive frequency fbt (2400 to 2497 MHz) of the Bluetooth terminal device may become an interference signal with respect to the GPS frequency, as shown in FIG. 1, thus possibly leading to malfunction of the GPS operation.

Figure 2:
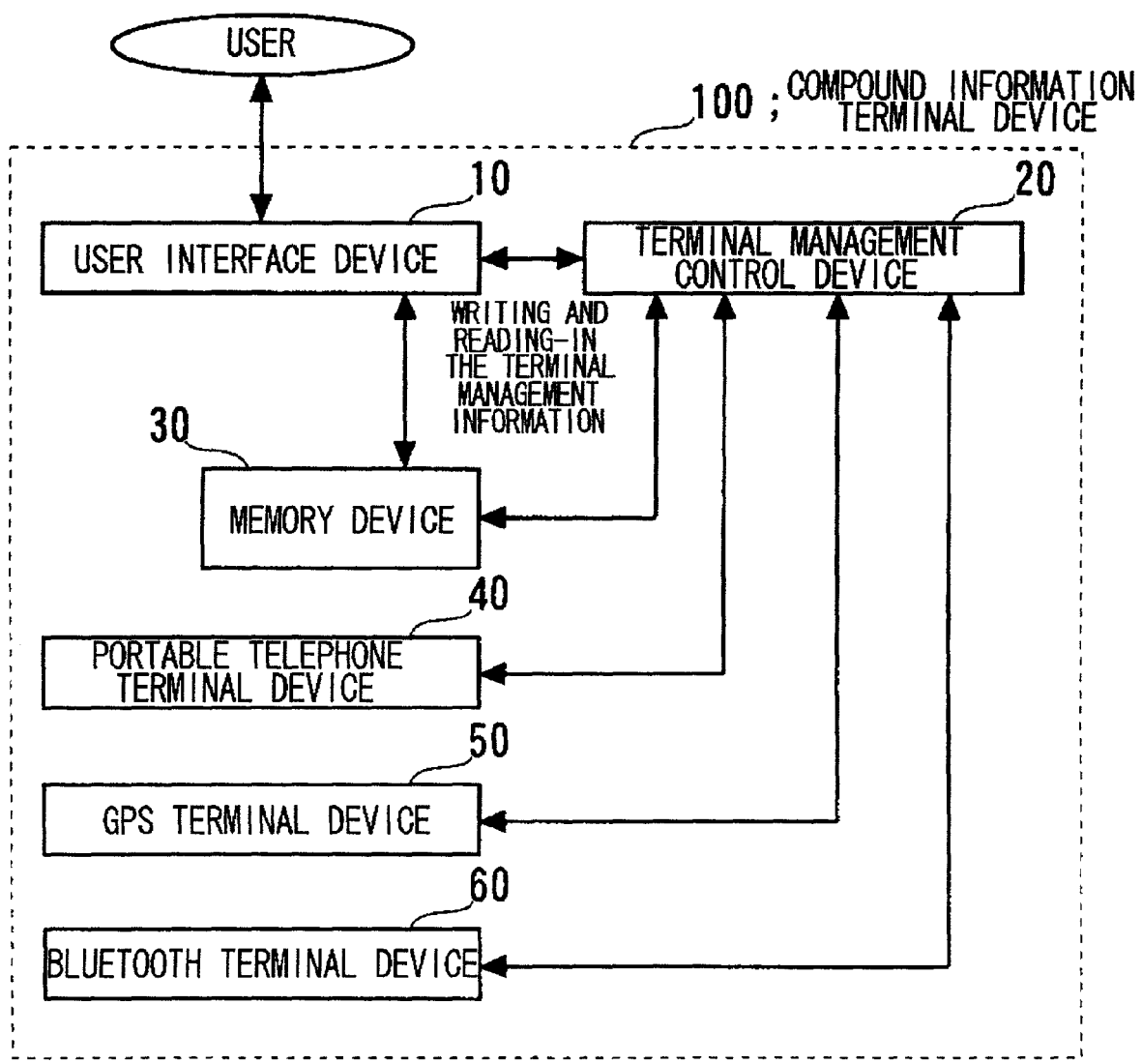
FIG. 2 shows the structure of a terminal of an embodiment (first embodiment) of the present invention.

Referring to FIG. 2, in an embodiment of the compound information terminal device of the present invention, the compound information terminal device includes a terminal management control device 20 which performs exclusive control in such a manner that, when an on-state request for a portable telephone terminal device 40, a GPS terminal device 50 and a Bluetooth terminal device 60 is input, the operation of turning on two of portable telephone terminal device 40, GPS terminal device 50 and the Bluetooth terminal device 60, or the operation of turning the portable telephone terminal device 40 on at all times, turning the GPS terminal device 50 on for a preset time, with the Bluetooth terminal device 60 being then turned off, then turning the Bluetooth terminal device on for a preset time, with the GPS terminal device 50 being then turned off, these operations being executed in alternation, based on the management information pre-stored in a memory device 30.

A user commands the use of one, two or all of the portable telephone terminal device 40, a GPS terminal device 50 and the Bluetooth terminal device 60, through a user interfacing device 10 within a compound information terminal device 100.

The user-interfacing device 10 sends the command to a terminal management control device 20.

The terminal management controls device 20 reads-in the information or the setting for executing the command from the memory device 30.

Based on the read-in information, the terminal management control device 20 performs exclusive on/off control of the powers of the portable telephone terminal device 40, GPS terminal device 50 and the Bluetooth terminal device 60 so that not all of the portable telephone terminal device 40, GPS terminal device 50 and the Bluetooth terminal device 60 will be transmitting/receiving the information simultaneously.

In an embodiment of the present invention, if, under exclusive control of the portable telephone terminal device 40, GPS terminal device 50 and the Bluetooth terminal device 60, a command for turning off one of the portable telephone terminal device 40, GPS terminal device 50 and the Bluetooth terminal device 60 is input, the terminal management control device 20 terminates the exclusive control.

If, under exercising exclusive control of the GPS terminal device 50 and the Bluetooth terminal device 60, communication connection of the Bluetooth terminal device 60 with other Bluetooth terminal devices is disconnected, the terminal management control device 20 may perform control of turning off the Bluetooth terminal device and switching the portable telephone terminal device and the GPS terminal device on at all times.

The control of the terminal devices by the terminal management control device 20 in an embodiment of the present invention may be applied not only to the Bluetooth terminal device but also to e.g., a wireless LAN terminal. That is, the present invention is applied to a compound information terminal device at least including a first transmission/reception device for performing transmission/reception using a first frequency band, a second transmission/reception device for performing transmission/reception using a second frequency band, and a first reception system for receiving a signal of third frequency band, with the intermodulation distortion of a signal of the first frequency band and a signal of the second frequency band having a frequency component overlapping with the third frequency component. The compound information terminal device performs exclusive control of turning on up to any two systems of the first transmission/reception system, second transmission/reception system and the first reception system or turning on one system of the first transmission/reception system, second transmission/reception system and the first reception system at all times, while turning one system and other system of the remaining two systems on and off, respectively, and subsequently of turning the one and the other system off and on, respectively, with the on/off operation being performed repeatedly. By so controlling, it is possible to evade such a situation in which the third frequency band is affected by the intermodulation caused by the first frequency band signal and the second frequency band signal.

For further explanation of the above-described embodiment of the present invention, certain preferred embodiments of the present invention will be explained with reference to the drawings.

FIG. 2 shows the structure of a terminal comprised of a portable telephone, GPS, Bluetooth integrated together, termed a "compound information terminal device".

Referring to FIG. 2, the compound information terminal device is made up of a user interfacing device 10, a terminal management control device 20, a memory device 30, a portable telephone terminal device 40, a GPS terminal device 50 and a Bluetooth terminal device 60.

Figure 3:
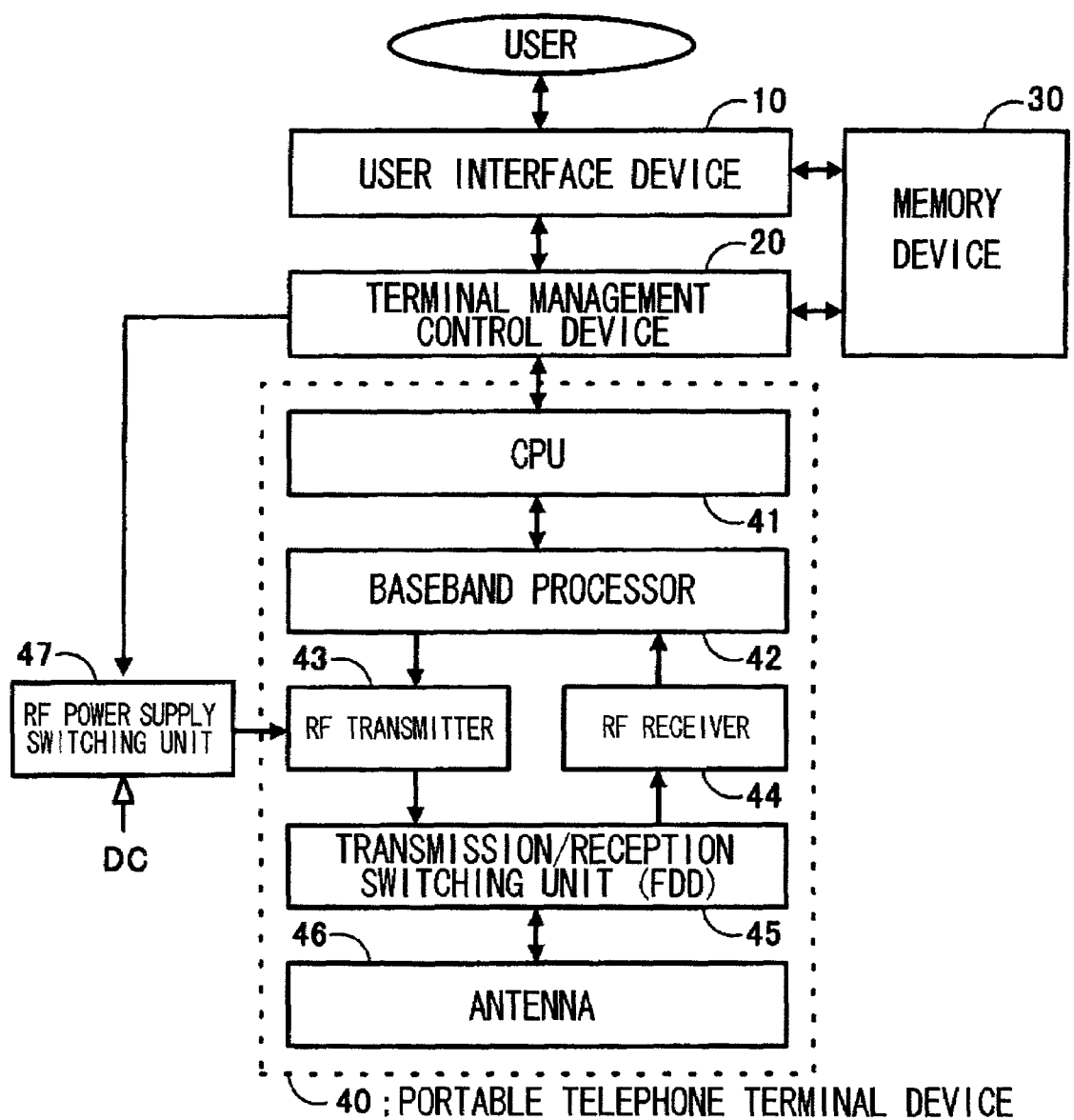
FIG. 3 shows the structure of a portable telephone terminal device in a terminal in the first embodiment of the present invention.

FIG. 3 shows a structure of the portable telephone terminal device 40 shown in FIG. 2. Referring to FIG. 3, the portable telephone terminal device 40 comprises an antenna unit 46, a transmission/reception switching unit (frequency division duplex: FDD) 45, an RF transmitter 4, an RF receiver 44, a baseband processor unit 42, and a CPU unit 41 for performing modulation/demodulation processing and control processing. An RF power source switching unit 47, connected to the terminal management control device 20, receives a control signal from the terminal management control device 20 to turn DC power supply to the RF transmitter 43 on and off responsive to the control signal from the terminal management control device 20. If the power supply to the RF transmitter 43 is turned off, the power supply to the RF receiver 44 may also be turned off. Alternatively, the RF transmitter 43 may be inactivated, that is, be set to a state of transmission being disabled for not transmitting signal, by switching the signal path of the transmission signal of the RF transmitter 43 to an off state by a switch, not shown.

Figure 4:
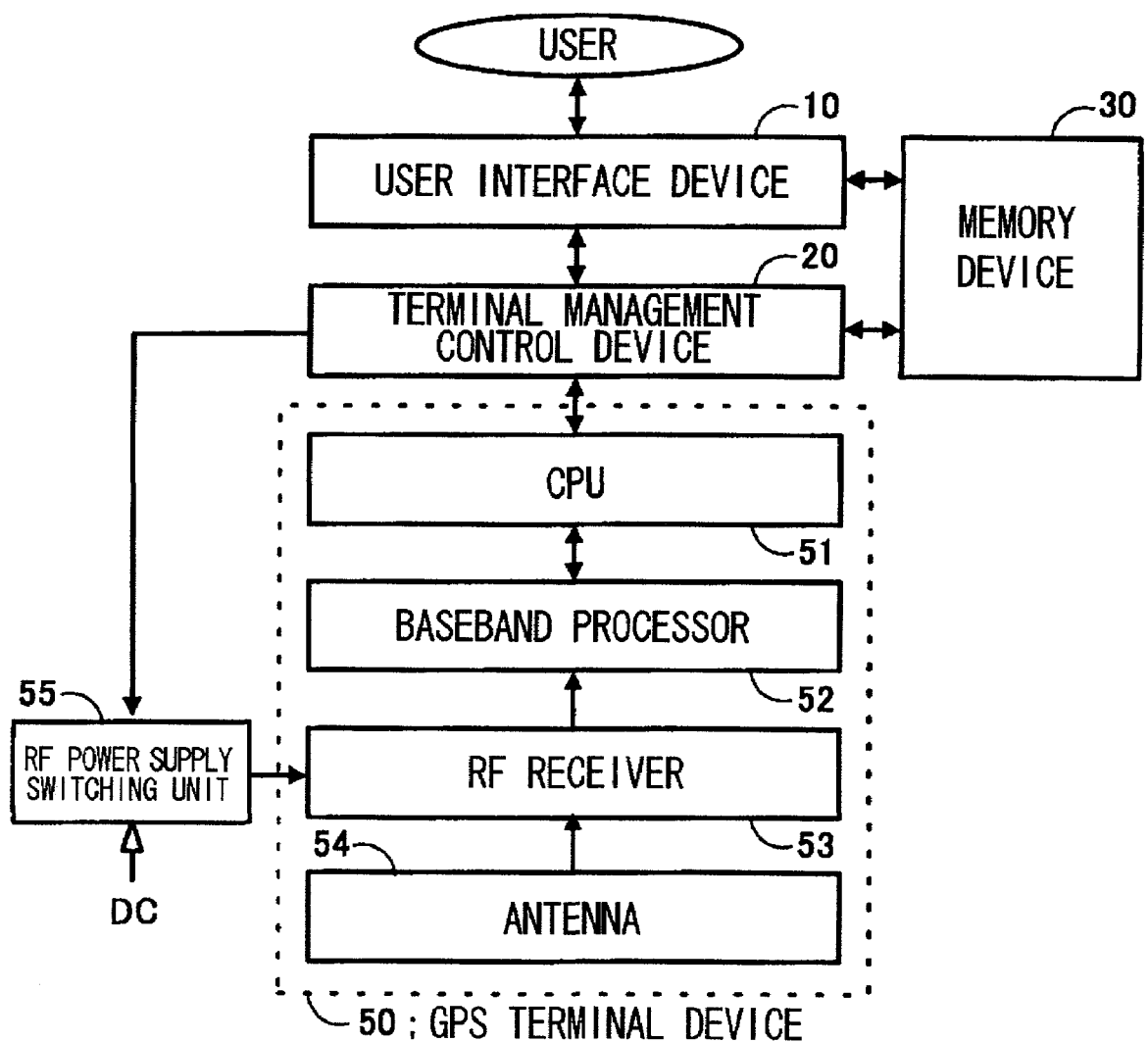
FIG. 4 shows the structure of a GPS terminal device in a terminal in the first embodiment of the present invention.

FIG. 4 shows the structure of the GPS terminal device 50 shown in FIG. 2. Referring to FIG. 4, the portable telephone terminal device 40 includes an antenna unit 54, a RF receiver 53, a baseband processor 52, and a CPU unit 51 performing demodulation or and control. An RF power supply switching unit 55, connected to the terminal management control device 20, receives a control signal from the terminal management control device 20 to control the on/off of the DC power supply to the RF receiver 53. Alternatively, the signal path of the signal to be received by the receiver 53 may be switched to a disconnected state by a switch, not shown, to inactivate the RF receiver 53, that is, being set to a state of reception being disabled for not receiving signal.

Figure 5:
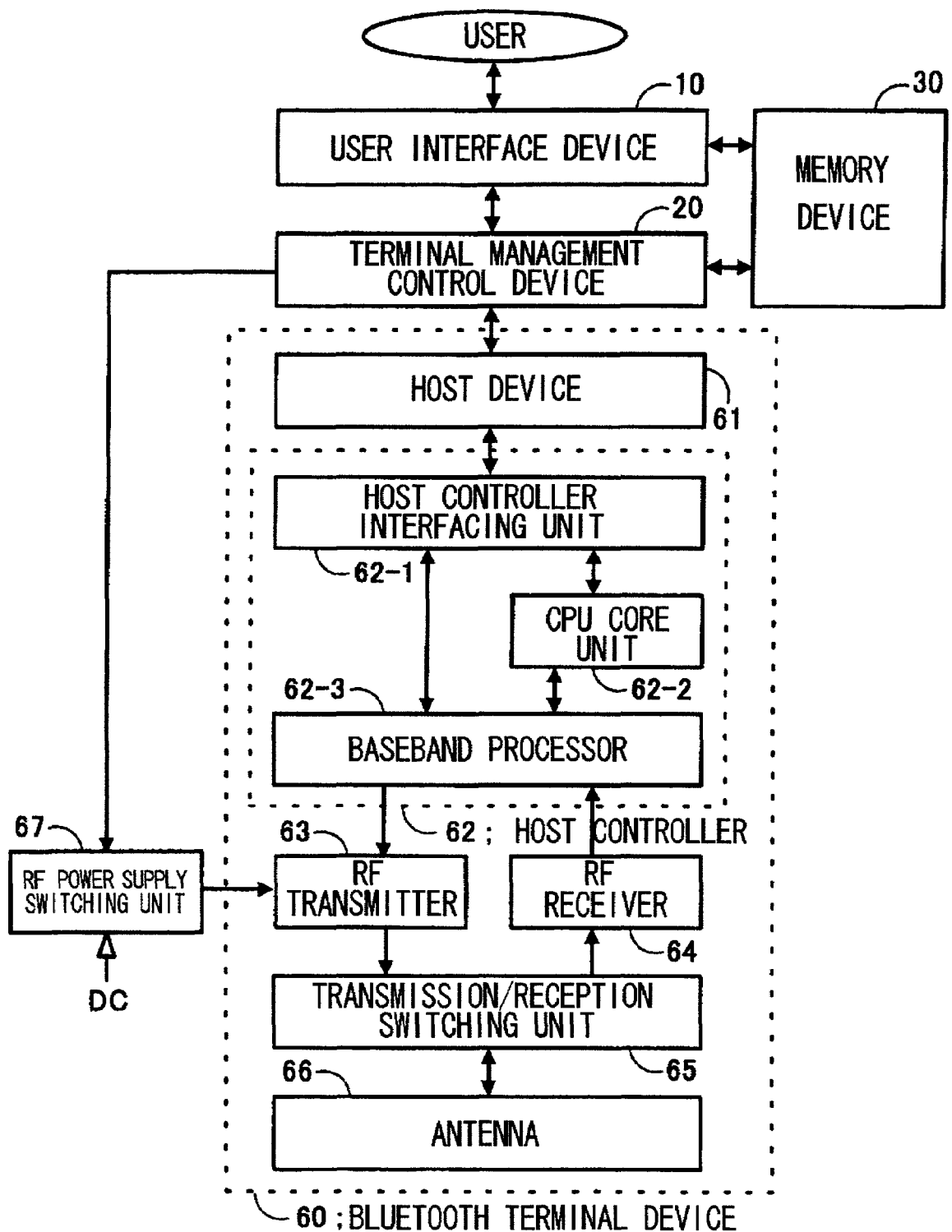
FIG. 5 shows the structure of a Bluetooth terminal device in a terminal in the first embodiment of the present invention.

FIG. 5 shows the structure of the Bluetooth terminal device 60 shown in FIG. 2. It is noted that, as for the low-layer structure of the Bluetooth software stack, reference may be had to BLUETOOTH SPECIFICATION Version 1.0B, November, 1999 page 524, 425, FIGS. 1.1 and 1.2. Referring to FIG. 5, the Bluetooth terminal device 60 includes an antenna unit 66, a transmission/reception switching unit (frequency division duplex FDD) 65, an RF transmitter unit 63, an RF receiver unit 64, a host controller unit62, and a host unit 61 taking charge of the interfacing to the terminal management control device 20. The host controller unit 62 has, in its inside, a host controller interfacing unit 62-1, a CPU core unit 62-2 and a baseband processor unit 62-3. The host controller-interfacing unit 62-1 performs control to mediate the host unit 61 and the host controller unit 62, while the CPU core unit 62-2 establishes and authenticates the connection to other Bluetooth terminal devices while taking charge of other control operations. The CPU core unit 62-2 may also perform control to effectuate the processing between the CPU core units of the lower order layers, without through the processing of the hosts of other Bluetooth terminal devices (higher layers) to inform the host of the results of the processing between the CPU core units. The baseband processor 62-3 is also termed a "link controller". A RF power supply-switching unit 67 receives a control signal from the terminal management control device 20 to perform on/off control of the DC power supply to the RF transmitter 63. In case the power supply to the RF transmitter 63 is turned off, the power supply to the RF receiver unit 64 may simultaneously be turned off. Alternatively, the RF transmitter 63 may be inactivated, that is, be set to a state of the communication being disabled, by turning off the signal path of the transmitted signals by a switch, not shown, by, for example, by setting an input or an output of an amplifier in the RF transmitter 63 to the GND(ground) level.

Referring to FIGS. 2 to 8, the operation of the preferred embodiment of the present invention is explained in detail.

Figure 6:
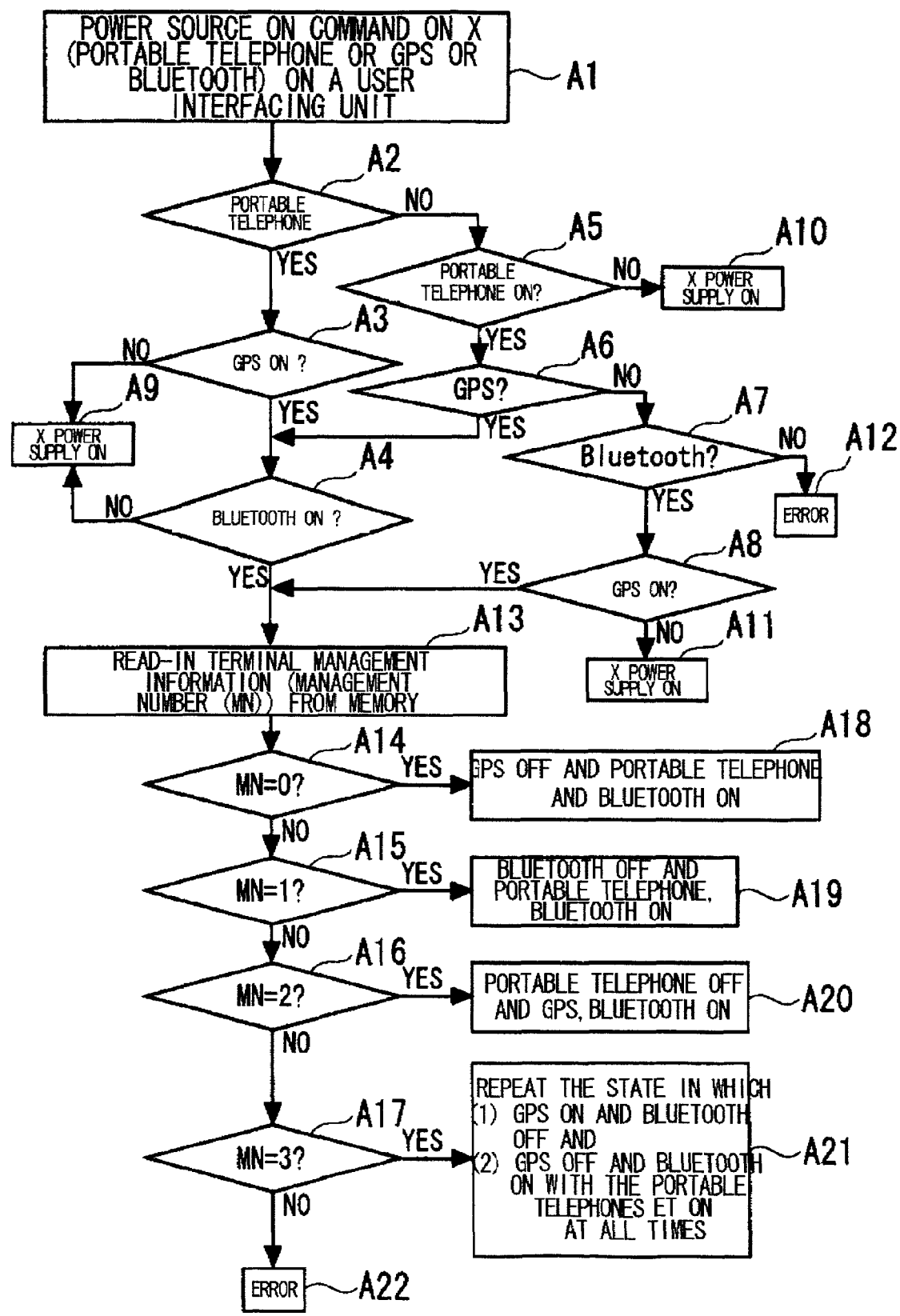
FIG. 6 is a flow diagram for illustrating the operation of an embodiment of the present invention.
Figure 7:
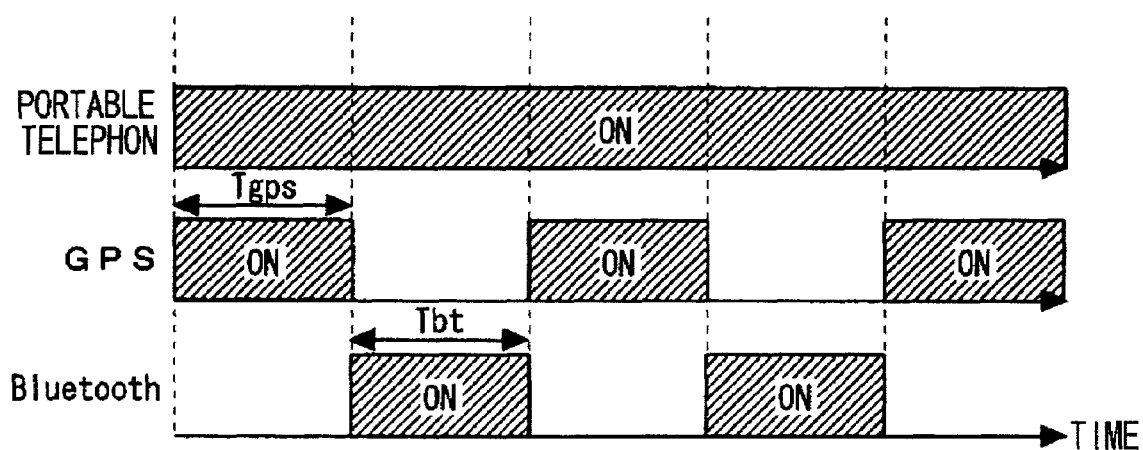
FIG. 7 schematically shows the operation of an embodiment of the present invention.
Figure 8:
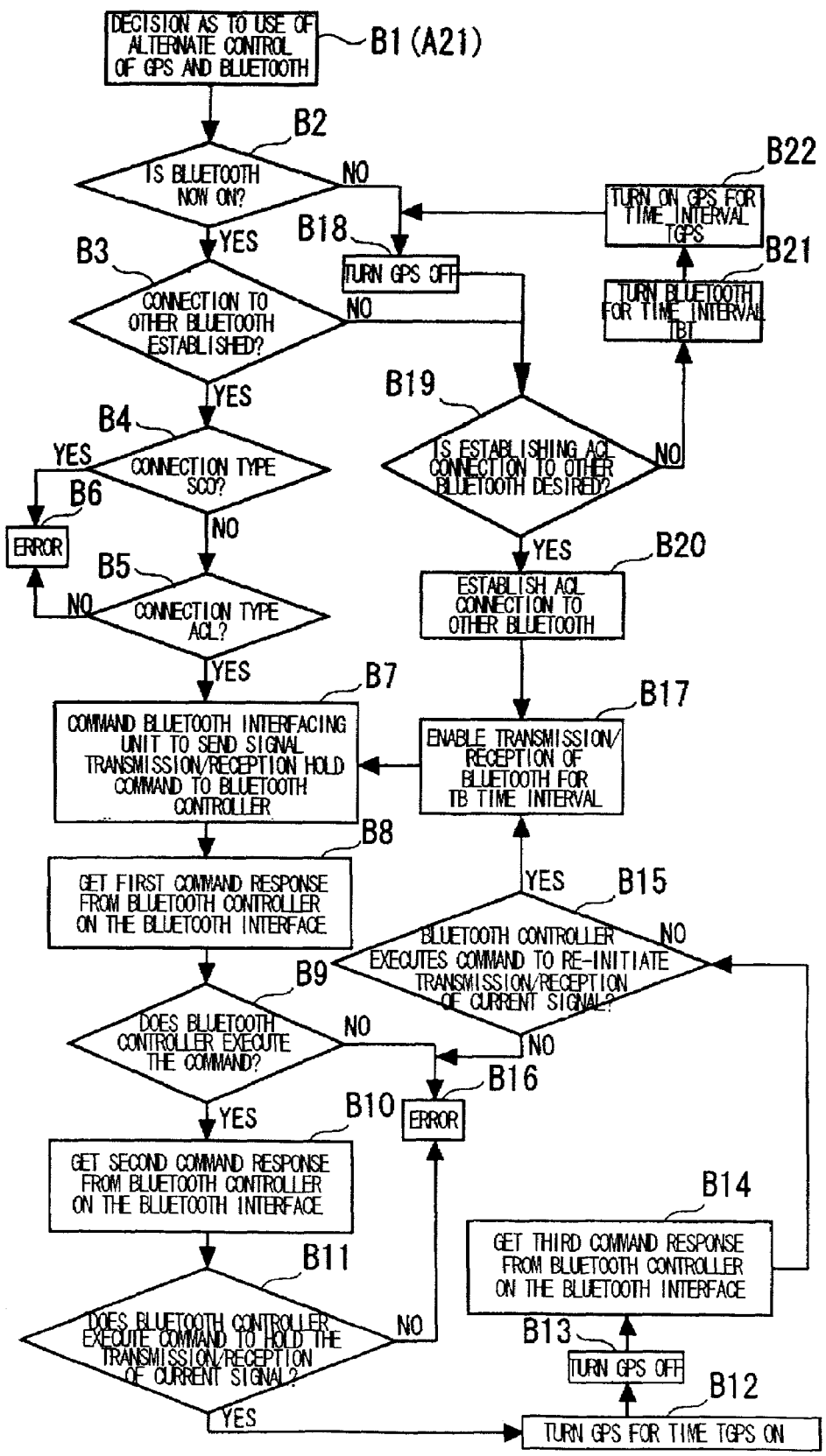
FIG. 8 is a flow diagram for illustrating the operation of an embodiment of the present invention.

FIG. 6 shows a flowchart for illustrating the control operation in case the use of one, two or all of the portable telephone terminal device 40, GPS terminal device 50 and the Bluetooth terminal device 60 is commanded to the terminal management control device 20. FIG. 7 shows the on/off state of the portable telephone terminal device 40, GPS terminal device 50 and the Bluetooth terminal device 60 in case that the terminal management control device 20 alternately controls the GPS terminal device 50 and the Bluetooth terminal device 60 while the portable telephone terminal device 40 is set to a state of being in use at all times. FIG. 8 shows a flowchart for illustrating the control operation in case that the terminal management control device 20 alternately controls the GPS terminal device 50 and the Bluetooth terminal device 60 while the portable telephone terminal device 40 is set to a state of being in use at all times.

Referring to FIG. 6, if a user commands, through an user interfacing device 10, the use of a terminal device X the user desires to use, the terminal management control device 20 at steps A1 to A8 verifies the terminal device X and the terminal device currently being in use. The terminal device X is one of the portable telephone terminal device 40, GPS terminal device 50 and the Bluetooth terminal device 60. Specifically, if the terminal device X is a portable telephone terminal device (YES branch path of step A2), and the GPS terminal device is currently not ON (NO branch path at step A3), the terminal device X is turned on (step A9). If the GPS terminal device at step A3 is currently ON (YES branch path of step A3), and the Bluetooth terminal device is OFF (NO branch path of step A4), the terminal device X is turned on (step A9). If the Bluetooth terminal device 60 is ON at step A4, the three terminal devices are ON, so that a branching is made to step A13.

If, at step A2, the terminal device X, desired to be used, is not a portable telephone (NO branch path at step A2), and the portable telephone terminal device is OFF (NO branch path at step AS), the terminal device X is turned on (step A10). If the portable telephone terminal device is ON (YES branch path at step AS), the terminal device X desired to be used is the GPS terminal device (YES branch path at step A6) and the Bluetooth terminal device is OFF (NO branch path of step A4), the GPS terminal device is turned on (step A9). If, at step A6, the terminal device X desired to be used is not the GPS terminal device (NO branch path at step A6), and the terminal device X desired to be used is not the Bluetooth terminal device (NO branch path at step A7), an error handling is executed (step A12). If, at step A7, the terminal device X desired to be used is the Bluetooth terminal device (YES branch path at step A7), and the GPS terminal device is OFF, the terminal device X desired to be used (Bluetooth terminal device) is turned on (step A11). If the GPS terminal device is ON branching is made to step A13.

If, in the course of the steps A1 to A7 of FIG. 6, the terminal device X the terminal management control device 20 desires to use cannot be confirmed, an error is returned to the user interfacing device 10.

If the sum total of the numbers of the terminal devices X desired to be used and those being in current use is less than or equal to two, the terminal device X desired is turned on (steps A19 to A11).

If the sum total of the numbers of the terminal devices X desired to be used and those being in current use is three, the terminal management control device 20 at step A13 reads from the memory device 30 a management number (termed as MN) of a terminal management information, which is set by a user beforehand.

If the MN value is 0 at step A14, the terminal management control device 20 sets the GPS terminal device 50 off, while setting the Bluetooth terminal device 60 on (step A18). If the GPS terminal device 50 is to be turned off, the turning-off may be informed to the user for confirmation.

If the MN value is 1 (step A15), the terminal management control device 20 sets the Bluetooth terminal device 60 off, while turning the portable telephone terminal device 40 and the GPS terminal device 50 on (step A19). If the Bluetooth terminal device 60 is to be turned off, the turning-off may be informed to the user for confirmation.

If the MN value is 2 (step A16), the terminal management control device 20 sets the portable terminal device 40 off, while turning the GPS terminal device 50 and the Bluetooth terminal device 60 on (step A20). If the Bluetooth terminal device 60 is to be turned off, the turning-off may be informed to the user for confirmation.

Referring to FIG. 7, in case the MN value is 3 (step A17), the terminal management control device 20 performs control at step A21 of alternately switching between a state in which the GPS terminal device 50 is ON and the Bluetooth terminal device 60 is OFF for a time period as set by the user or set by the compound information terminal device 100, and a state in which the GPS terminal device 50 is OFF and the Bluetooth terminal device 60 is ON for a time period as set by the user or set by the compound information terminal device 100, with the portable telephone terminal device 40 remaining ON at all times. It is noted that the time during which the GPS terminal device 50 is ON and the time during which the Bluetooth terminal device 60 is ON are termed the "Tgps time" and "Tbt time", respectively.

If the MN takes a value other than 0, 1, 2 or 3, the terminal management control device 20 returns an error to the user interfacing device 10.

Referring to FIG. 8, after a decision is made (step A21 of FIG. 6 and step B1 of FIG. 8), to the effect that switching is made alternately between the state in which the GPS terminal device 50 is ON and the Bluetooth terminal device 60 is OFF during the time Tgps and the the state in which the GPS terminal device 50 is OFF and the Bluetooth terminal device 60 is ON during the time Tbt, with the portable telephone terminal device 40 being kept ON at all times, the terminal management control device 20 verifies at step B2 that the Bluetooth terminal device 60 currently is ON (step B2).

If the Bluetooth terminal device 60 is ON, the terminal management control device 20 checks at step B3 whether or not the Bluetooth terminal device 60 has established its connection to other Bluetooth terminals.

If the Bluetooth terminal device 60 has established its connection to other Bluetooth terminals, it checks whether or not the connection type is SCO or ACL (steps B4 and B5). It is noted that "SCO" and "ACL" denote synchronous communication and the asynchronous communication, respectively.

If the connection type is SCO or neither SCO nor ACL, the terminal management control device 20 returns an error to the user-interfacing device 10 (step B6).

If the connection type is ACL, the terminal management control device 20 commands a host (61 in FIG. 5), forming an interfacing unit of the Bluetooth terminal device 60, to hold signal transmission/reception (step B7).

In response to the command from the terminal management control device 20, the host of the Bluetooth terminal device 60 transmits a command for holding transmission/reception (HCL_Hold_Mode);

a connection number of its parameter (Connection_Handle);

a maximum hold time interval (Hold_Mode_Max_Interval); and a minimum hold time interval (Hold_Mode_Min_Interval) to a host controller (62 of FIG. 5) forming a control unit of the Bluetooth terminal device 60.

Next, the host of the Bluetooth terminal device 60 receives, a first response to the command (Command Status);

a command executing status of the parameter (Status);

number of transmittable command packets (Num_HCI_Command_Packets); and command execution number (Command_Opcode) from a host controller of the Bluetooth terminal device 60 (step B8).

The terminal management control device 20 receives the command executing status (Status) from the host controller of the Bluetooth terminal device 60 and, from the status of the command execution (Status), certifies whether or not the command is normal (step B9) and, if the command is not normal, returns an error to the user interfacing device 10 (step B16).

If the status of command execution (Status) is normal, the host of the Bluetooth terminal device 60 receives, a second response to the command (Mode Change);

the command executing state of the parameter (Status);

the connection number (Connection_Handle);

the status of the current Bluetooth terminal device 60 (Current_Mode); and transmission/reception holding time interval (Interval) from a host controller of the Bluetooth terminal device 60 (step B10).

The terminal management control device 20 verifies whether the command is normal, from the status of the command execution (Status), and verifies whether the status is the transmission/reception holding status (step B11), from the current status(Current_Mode) of the Bluetooth terminal device 60. If the command is not normal, or if the status is not the transmission/reception holding state, the terminal management control device 20 returns an error to the user interfacing device 10 (step B16).

If the command is normal and the status is the transmission/reception holding status, the terminal management control device 20 sets the GPS terminal device 50 to the ON state for a time interval Tgps (step B12).

After lapse of the time Tgps, the terminal management control device 20 turns the GPS terminal device 50 to an off state (step B13).

The host of the Bluetooth terminal device 60 then receives, from the host controller of the Bluetooth terminal device 60, a third response to the command (Mode Change);

the command executing state of the parameter (Status);

the connection number (Connection_Handle);

the status of the current Bluetooth terminal device 60 (Current_Mode); and transmission/reception holding time interval (Interval) from the host controller of the Bluetooth terminal device 60 (step B14).

The terminal management control device 20 checks whether the command is normal, from the command executing state of the parameter (Status), and checks whether the status is the transmission/reception re-initiating status, from the current status of the Bluetooth terminal device 60 (step B15). If the command is not normal or if the status is not the transmission/reception re-initiating status, the terminal management control device 20 returns an error to the user interfacing device 10 (step B16).

If the command is normal, and the status is the transmission/reception re-initiating status, the terminal management controls device 20 sets the GPS terminal device 50 to a transmission/reception enabling state for the time Tbt (step B17).

After lapse of the time Tbt, the terminal management control device 20 again commands the host of the Bluetooth terminal device 60 to hold the transmission/reception(step B7).

Subsequently, the processes from step B7 to step B17 are repeated.

If, at step B2, the Bluetooth terminal device 60 is in the OFF state, the terminal management control device 20 sets the GPS terminal device 50 to the off state (step B18).

The terminal management control device 20 then inquires the user interfacing device 10 as to whether or not the Bluetooth terminal device 60 desires to establish the ACL connection to other Bluetooth terminal devices 60 (step B19).

If the Bluetooth terminal device 60 desires so, the terminal management control device 20 sets the ACL connection of the Bluetooth terminal device 60 to other Bluetooth terminal devices 60 (step B20).

The terminal management controls device 20 then sets the Bluetooth terminal device 60 to the transmission/reception enabling state for the time interval Tbt (step B17).

If, after lapse of the time interval Tbt, the terminal management control device 20 again commands the host of the Bluetooth terminal devices 60 to hold the transmission/reception (step B7).

Subsequently the processes from step B7 to step B17 are repeated.

If, st step B19, the user does not desire to set up the ACL connection between the Bluetooth terminal device 60 and the other Bluetooth terminal devices 60, through the user interfacing device 10, the terminal management control device 20 sets the Bluetooth terminal device 60 to the ON state for the time Tbt (step B21).

After the time Tbt, the terminal management controls device 20 sets the Bluetooth terminal device 60 to the OFF state to turn the GPS terminal device 50 to the ON state for the time interval Tbt (step B21).

After lapse of the time Tbt, the terminal management control device 20 turns the Bluetooth terminal device 60 to the OFF state to set the GPS terminal device 50 to the OFF state for the time interval Tgps (step B22).

After lapse of the time Tgps, the terminal management controls device 20 sets the GPS terminal device 50 to the OFF state (step B18).

The terminal management control device 20 again inquires the user interfacing device 10 as to whether or not the Bluetooth terminal device 60 desires to establish the ACL connection to other Bluetooth terminal devices 60 (step B19).

Subsequently, the processes of step of B19, B21, B22 up to B18 are repeated except if the user desires to set up the ACL connection of the Bluetooth terminal device 60 and the other Bluetooth terminal devices through the user interfacing device 10.

Moreover, if, at step B3, the connection between the Bluetooth terminal device 60 and the other Bluetooth terminal devices has as yet not been established, the terminal management control device 20 inquires the user interfacing device 10 as to whether or not the Bluetooth terminal device is desirous to establish the ACL connection with the other Bluetooth terminal devices (step B19).

A second embodiment of the present invention is now explained in detail with reference to the drawings. In the present second embodiment, if, as the terminal management control device 20 explained in the above-described embodiment is performing exclusive control (step A21 of FIG. 6) of alternately switching the state of the GPS terminal device 50 being ON and the Bluetooth terminal device 60 being OFF for the time interval of Tgps and the state of the GPS terminal device 50 being OFF and the Bluetooth terminal device 60 being ON for the time interval of Tbt, with the portable telephone terminal device 40 being ON at all times, the user issues a command to turn a certain terminal device off through the user interfacing device 10, the terminal management control device 20 turns the terminal management control device commanded by the user OFF, while halting the exclusive control of the terminal management control device and turning the other two terminal devices ON at all times. For example, if the portable telephone terminal device is to be turned OFF, the GPS terminal device 50 and the Bluetooth terminal device 60, alternately turned on and off, are set at all times to the ON state.

Figure 9:
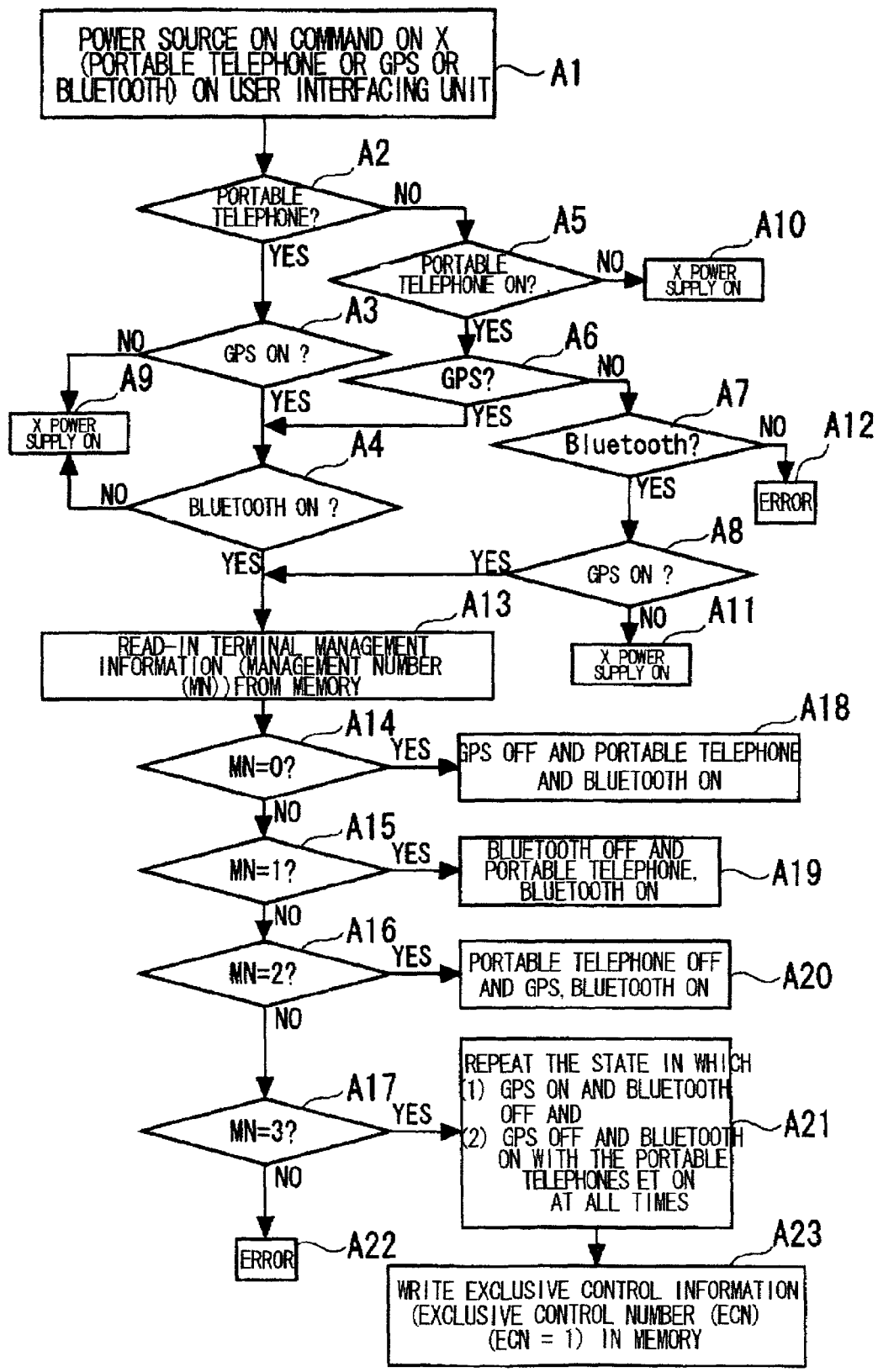
FIG. 9 is a flow diagram for illustrating the operation of a second embodiment of the present invention.
Figure 10:
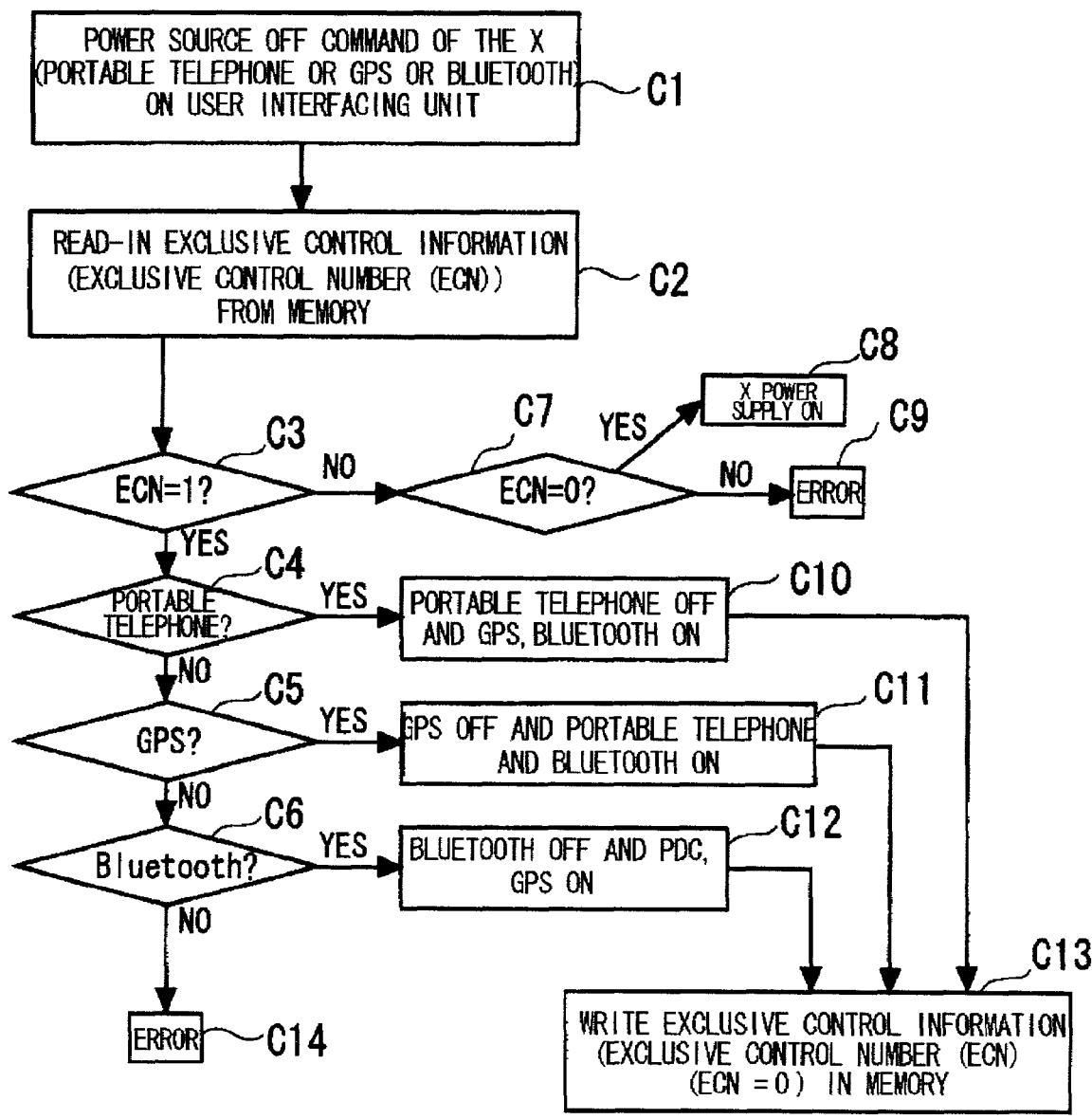
FIG. 10 is a flow diagram for illustrating the operation of the second embodiment of the present invention.

FIGS. 9 and 10 are flow diagrams for illustrating the processing of the second embodiment of the present invention. Referring to FIGS. 9 and 10, the operation of the second embodiment of the present invention is hereinafter explained.

Referring to FIG. 9, the control process executed by the terminal management control device 20 when the user commands the use of the terminal device desired to be used (one of the portable telephone terminal device 40, GPS terminal device 50 and the Bluetooth terminal device 60) through the user interfacing device 10, is the same as the above-described first embodiment (steps A1 to A22 of FIG. 6).

If the terminal management control device 20 has to perform the exclusive control (step A21) of alternately switching the state of the GPS terminal device 50 being ON and the Bluetooth terminal device 60 being OFF for the time interval of Tgps and the state of the GPS terminal device 50 being OFF and the Bluetooth terminal device 60 being ON for the time interval of Tbt, with the portable telephone terminal device 40 being ON at all times, the terminal management control device 20 writes 1 as a value of the Exclusive Control Number (termed as ECN) as the exclusive control information (step A23).

Referring to FIG. 10, when the user issues a command to turn a terminal device (terminal device X) off through the user interfacing device 10 (step C1), the terminal management control device 20 reads the ECN value from the memory device 30 (step C2).

If the ECN value is 0, the terminal management control device 20 turns off the terminal device X that the user commanded to be turned off(steps C3, C7, and C8).

If the ECN value is 1 and the terminal device the user commanded to be turned off is the portable telephone terminal device 40, the terminal management control device 20 sets the portable telephone terminal device 40 OFF, while setting the GPS terminal device 50 and the Bluetooth terminal device 60 ON at all times, and writing 0 as the ECN value in the memory device 30 (steps C3, C4, C10, and C13).

If the ECN value is 1 and the terminal device X commanded by the user to be turned off is the GPS terminal device 50, the terminal management control device 20 turns the GPS terminal device 50 off, while turning the portable telephone terminal device 40 and the Bluetooth terminal device 60 off at all times and writing 0 as the value of the ECN in the memory device 30 (steps C3, C4, C11 and C13).

If the ECN value is 1 and the terminal device X commanded by the user to be turned off is the Bluetooth terminal device 60, the terminal management control device 20 sets the GPS terminal device 50 off, while turning the portable telephone terminal device 40 and the Bluetooth terminal device 60 on at all times and writing 0 as the value of the ECN in the memory device 30 (steps C3, C4, C11 and C13).

If the ECN value is 1, and the terminal device X, which the user commanded to turn off, cannot be identified, the terminal management control device 20 returns an error to the user interface device 10 (steps C3, and C14).

If the ECN value is neither 0 nor 1, the terminal management control device 20 returns an error to the user interfacing device 10 (steps C3, C4, and C9).

Referring to the drawings, a third embodiment of the present invention is now explained in detail. The present third embodiment differs from the above-described first embodiment in that, if the ACL connection (asynchronous connection) of the Bluetooth terminal device 60 to a certain Bluetooth terminal device is disconnected at an option of the certain Bluetooth terminal device, the terminal management control device 20 performs control to turn the Bluetooth terminal device 60 off.

FIG. 11 is a flow diagram for illustrating the processing of the third embodiment of the present invention. The operation of the present third embodiment of the present invention is hereinafter explained.

Referring to FIG. 11, the terminal management control device 20 receives from a host controller of the Bluetooth terminal device 60, through the host of the Bluetooth terminal device 60, a report on the disconnection with the certain Bluetooth (Disconnection Complete), the status of the command execution of the parameter (Status), disconnected connection number (Connectin_Handle) and the reason for disconnection (Reason) (step D1).

The terminal management control device 20 verifies whether or not the command is correct, from the state of execution of the command (Status) and, if the command is not normal, finishes the control of the present third embodiment (steps D2, D6).

If the command is normal, the ECN value is read-in from the memory device 30 (steps D2, D3).

If the ECN value is 0, the terminal management control device 20 finishes the control of the present third embodiment (D3, D6).

If the ECN value is 1, the terminal management control device 20 verifies whether or not the Bluetooth terminal device 60 has established ACL connection to other Bluetooth terminals (steps D3, D4).

If the ACL connection has been established, the terminal management control device 20 finishes the control of the present third embodiment.

If the ACL connection has not been established, the terminal management control device 20 shifts to the control of turning the Bluetooth terminal device 60 off (the above-described second embodiment) (steps D4 and D5).

Although the present invention has been described with reference to the preferred embodiments thereof, the contents of the drawings referenced in the explanation of the embodiments are intended for exemplary description of the present invention. The present invention is not limited to the above-described structures of the embodiments and may, of course, comprise various modifications and corrections that would be apparent to those skilled in the art from reading the claims.

The meritorious effects of the present invention are summarized as follows.

According to the present invention, described above, the following meritorious effects may be achieved.

The first effect of the present invention is that, by exclusively controlling the transmission/reception in each of the portable telephone terminal device, GPS terminal device and the Bluetooth terminal device, in a device having these terminal devices integrated together, it is possible to evade the effect of the reception of the GPS terminal device 50.

The second effect of the present invention is that, by turning off one of the portable telephone terminal device, GPS terminal device and the Bluetooth terminal device, the portable telephone terminal device, GPS terminal device and the Bluetooth terminal device, controlled exclusively, can be switched to normal control.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A compound information terminal device at least comprising:
   a first communication device which performs wireless communication using a first frequency band;
   a second communication device which performs wireless communication using a second frequency band; and
   a third communication device which receives a signal of a third frequency band,
   means for performing a control operation so that when intermodulation distortion of a signal of the first frequency band handled by said first communication device with a signal of the second frequency band handled by said second communication device has a frequency component that enters in said third frequency band,
   up to two of said first to third communication devices are communication enabled at all times in accordance with a predetermined setting, or
   an alternate switching control is conducted such that while one of said first to third communication devices is communication enabled at all times, one of the remaining two devices is communication enabled for a preset time period during which the other is communication disabled, and subsequently said one communication device is communication disabled for a preset time period during which the other communication device is communication enabled.

2. The compound information terminal device as defined in claim 1 wherein
   in performing switching control of the first and the second communication devices to communication enabled and communication disabled states, a power supply of a transmitter in each of the first and second communication devices is turned on and off, respectively.

3. The compound information terminal device as defined in claim 1 wherein
   in performing switching control of the first and the second communication devices to communication enabled and communication disabled states, a signal path of a transmission signal in a transmitter in each of said first and second communication devices is set to a connected state and to a disconnected state, respectively.

4. The compound information terminal device as defined in claim 1 wherein
   in performing switching control of said third communication device to communication enabled and communication disabled states, a power supply of a receiver of said third communication device is turned on and off, or
   a signal path of a receiving signal in the receiver of said third communication device is set to a connected state and to a disconnected state.

5. A compound information terminal device at least comprising:
   a first transmitter/receiver system which performs transmission and reception using a first frequency band;
   a second transmitter/receiver system which performs transmission and reception using a second frequency band; and
   a first receiver system which performs reception of a signal of a third frequency band; and
   means for turning on two of said three systems, namely the first transmitter/receiver system, second transmitter/receiver system and the first receiver system, at all times in accordance with a predetermined setting, or for turning on one of said three systems at all times while switching the remaining two systems on and off repeatedly where when one of the remaining two systems is on, the other system is off,
   wherein intermodulation distortion of a signal of said first frequency band with a signal of said second frequency band having a frequency component overlapping with said third frequency band.

6. The compound information terminal device as defined in claim 5 wherein
   in performing switching control of the first and the second transmitter/receiver systems on and off, a power supply switch for controlling a power supply fed to a RF transmitter in each of the first and the second transmitter/receiver systems is turned on and off, respectively.

7. The compound information terminal device as defined in claim 5 wherein
   in performing switching control of the first and the second transmitter/receiver systems on and off, a power supply switch of a RF transmitter in each of the first and the second transmitter/receiver systems is turned on and off, respectively and a power supply switch for controlling a power supply fed to a RF receiver in each of the first and the second transmitter/receiver systems is turned on and off.

8. The compound information terminal device as defined in claim 5 comprising means for performing switching control of a signal path in a RF transmitter in each of said first and second transmitter/receiver systems to connected and disconnected states in controlling said first and second transmitter/receiver systems on and off.

9. The compound information terminal device as defined in claim 5 wherein
   in performing switching control of the first receiver system on and off, a power supply switch for controlling a power supply fed to a RF receiver in the first receiver system is turned on and off, or
   a signal path of a receiving signal in the RF receiver of the first receiver system is set to a connected or in a disconnected state.

10. The compound information terminal device as defined in claim 5 wherein
said first transmitter/receiver system is turned on at all times, and wherein said second transmitter/receiver system and said first receiver system are alternately turned on and off, so that one of said second transmitter/receiver system and said first receiver system is turned on with the other being turned off and subsequently said one of said second transmitter/receiver system and said first receiver system is turned off with the other being turned off.

11. The compound information terminal device as defined in claim 5 wherein
said second transmitter/receiver system sets the transmission and reception to and from another terminal, with which said second transmitter/receiver system performs communication, to a pending state as necessary and then switches to an OFF state.

12. The compound information terminal device as defined in claim 5 wherein
said second transmitter/receiver system is a portable telephone terminal;
said second transmitter and receiver system is a wireless LAN terminal or a Bluetooth terminal; and
said first receiver system is a GPS terminal.

13. A compound information terminal device comprising:
a portable terminal device;
a GPS terminal device;
a Bluetooth terminal device, where said portable terminal device, said GPS terminal device and said Bluetooth terminal devices are integrated together; and
a terminal management control device which performs exclusive control so that:
if a power on request of one of said portable telephone terminal device, the GPS terminal device and the Bluetooth terminal device, is input, the request is detected and the requesting one is turned ON along with a terminal device in an ON state, thereby two of the portable telephone terminal device, GPS terminal device and the Bluetooth terminal device are turned on, with the remaining terminal device being turned off, or
said GPS terminal device is turned on with said Bluetooth terminal device being turned off for a preset time and subsequently said Bluetooth terminal device is turned on with said GPS terminal device being turned off, for a preset time interval, with the portable telephone terminal device being turned on at all times, with the on/off switching operations being carried out repeatedly between said GPS terminal device and said Bluetooth terminal device.

14. A compound information terminal device comprising:
a portable telephone terminal device;
a GPS terminal device;
a Bluetooth terminal device; and
a terminal management control device which performs exclusive control so that:
if on receipt of a power on request of one of said portable telephone terminal device, GPS terminal device and the Bluetooth terminal device, the request is detected and the requesting terminal is turned to an ON state along with the terminal device currently in an ON state, or
management information pre-stored in a storage device is read out and, based on setting value of said management information, two of said portable telephone terminal device, the GPS terminal device and the Bluetooth terminal device are turned on, with the remaining one terminal device being turned off, or
said GPS terminal device is turned on, with said Bluetooth terminal device being turned off, for a preset time, and subsequently said Bluetooth terminal device is turned on, with said GPS terminal device being turned off, while the portable telephone terminal device being turned on at all times, with an alternate switching of said GPS terminal device and said Bluetooth terminal device being carried out repeatedly.

15. The compound information terminal device as defined in claim 14, wherein
if a power on request of one of said portable telephone terminal device, GPS terminal device and the Bluetooth terminal device is received and, combined with the terminal device currently in the ON state, one or two of said portable telephone terminal device, GPS terminal device and the Bluetooth terminal device, is or are to be set to ON, two or less of said terminal devices are retained in the ON state to conform to the request.

16. The compound information terminal device as defined in claim 14 wherein if, under the exclusive control of said portable telephone terminal device, said GPS terminal device and said Bluetooth terminal device, a command is input to turn said portable telephone terminal device, GPS terminal device or the Bluetooth terminal device off, said terminal management control device finishes exclusive control.

17. The compound information terminal device as defined in claim 14 wherein if, under exclusive control state of said portable telephone terminal device, GPS terminal device and the Bluetooth terminal device, communication connection between said Bluetooth terminal device and other Bluetooth terminal devices is disconnected, said terminal management control device turns said Bluetooth terminal device off, while switching said portable telephone terminal device and the GPS terminal device to ON state at all times.

18. The compound information terminal device as defined in claim 14 wherein in turning off said portable telephone terminal device and the Bluetooth terminal device, power supply switches for performing switching control of power supply fed to a RF transmitter in each of said portable telephone terminal device and the Bluetooth terminal device are turned off, and wherein, in turning the GPS terminal device off, the power supply switches for performing switching control of power supply fed to the RF receivers of said GPS terminal device are turned off.

19. A method for controlling a compound information terminal device which comprises a first communication device which performs wireless communication using a first frequency band, a second communication device which performs wireless communication using a second frequency band, and a third communication device which performs reception of a wireless signal of a third frequency band, the method comprising:
when intermodulation distortion of a signal of the first frequency band handled by said first communication device with a signal of the second frequency band handled by said second communication device has a frequency component that is within said third frequency band:
enabling communication in accordance with a predetermined setting in up to two of said first to third communication devices, or
repeatedly switching two of the three communication devices to enable and disable communication so that one of said first to third communication devices is communication enabled at all times and one of the remaining two is communication enabled for a preset time period during which the other is communication disabled, said one terminal being subsequently communication disabled for a preset time period during which the other is communication enabled.

20. A method for controlling a compound information terminal device comprising a first transmitter/receiver device which performs transmission and reception using a first frequency band, a second transmitter/receiver device which performs transmission and reception using a second frequency band, and a first receiver system which receives a signal of third frequency band, the method comprising:

when intermodulation distortion of a signal of said first frequency band with a signal of said second frequency band having a frequency component overlapping with said third frequency band:

turning on, in accordance with a predetermined setting, two of three systems, namely the first transmitter/receiver system, second transmitter/receiver system and the first receiver system; or turning on at all times one of said three systems, while one and the other of the remaining two systems are turned on and off, respectively, and subsequently the one and the other system turned off and on, respectively, with said on/off switching operation being performed repeatedly.

21. A method for controlling a compound information terminal device comprising a portable telephone terminal device, a GPS terminal device, and a Bluetooth terminal device, integrated together in the compound information terminal, the method comprising:

when a power on request of one of said portable telephone terminal device, GPS terminal device and the Bluetooth terminal device is input:

detecting the request, and turning to state ON the requesting terminal device along with the terminal device currently in the ON state, or reading the management information pre-stored in a storage device; and, turning ON, based on the setting value of said management information, two of said portable telephone terminal device, GPS terminal device and the Bluetooth terminal device with the remaining one terminal device being turned off, or turning ON said GPS terminal with said Bluetooth terminal device being turned off, for a preset time, and subsequently turning ON said Bluetooth terminal device with said GPS terminal device being turned off, with the portable telephone terminal device being turned on at all times, and switching on/off the GPS terminal and the Bluetooth terminal device repeatedly.

22. The method as defined in claim 21, wherein if the power on request of one of said portable telephone terminal device, GPS terminal device, and the Bluetooth terminal device, is input, and one of the three terminal devices is currently in ON state, one or two of said three terminal devices are set to ON said terminal devices are retained in the ON states.

23. The method as defined in claim 21 wherein if, under exclusive control of said portable telephone terminal device, said GPS terminal device and said Bluetooth terminal device, a command is input to turn said portable telephone terminal device, GPS terminal device or the Bluetooth terminal device off, said exclusive control is finished.

24. The method as defined in claim 21 wherein if, under exclusive control of said portable telephone terminal device, said GPS terminal device and said Bluetooth terminal device, communication connection between said Bluetooth terminal device and other Bluetooth terminal devices is disconnected, and said Bluetooth terminal device is turned off, while said portable telephone terminal device and the GPS terminal device are switched to ON states at all times.

25. The compound information terminal device according to claim 1, wherein each of said first, second and third communication devices comprises a control number reflecting state of a device and wherein the means for performing a control operation changes values of the control number based on a desired state of device controlling interference between the first, second, and third frequency bands.

* * * * *